(12) United States Patent
Sugiyama

(10) Patent No.: US 6,972,758 B2
(45) Date of Patent: Dec. 6, 2005

(54) METHODS AND APPARATUS FOR RENDERING AN IMAGE INCLUDING PORTIONS SEEN THROUGH ONE OR MORE OBJECTS OF THE IMAGE

(75) Inventor: Hajime Sugiyama, Tokyo (JP)

(73) Assignee: Sony Computer Entertaiment Inc., (JP)

( * ) Notice: Subject to any disclaimer, the term of this patent is extended or adjusted under 35 U.S.C. 154(b) by 0 days.

(21) Appl. No.: 10/909,637

(22) Filed: Aug. 2, 2004

(65) Prior Publication Data
US 2005/0001834 A1    Jan. 6, 2005

Related U.S. Application Data

(63) Continuation of application No. 09/656,377, filed on Sep. 6, 2000, now Pat. No. 6,784,882.

(30) Foreign Application Priority Data
Sep. 10, 1999    (JP)    .................... 11-257565

(51) Int. Cl.⁷ ............................................. G06F 15/00
(52) U.S. Cl. ...................... 345/419; 345/420; 345/421; 345/426; 345/581; 345/606
(58) Field of Search ................... 345/419–421, 345/426, 581–582, 606–610

(56) References Cited

U.S. PATENT DOCUMENTS

| | | |
|---|---|---|
| 5,043,922 A | 8/1991 | Matsumoto |
| 5,359,704 A | 10/1994 | Rossignac et al. |
| 5,369,734 A | 11/1994 | Suzuki et al. |
| 5,461,712 A | 10/1995 | Chelstowski et al. |
| 5,533,185 A | 7/1996 | Lentz et al. |
| 5,544,292 A | 8/1996 | Winser |
| 5,561,746 A | 10/1996 | Murata et al. |
| 5,579,454 A | 11/1996 | Billyard et al. |
| 5,615,322 A * | 3/1997 | Murata et al. ............... 345/427 |
| 5,644,689 A | 7/1997 | Ban et al. |
| 5,720,020 A | 2/1998 | Tannenbaum et al. |

(Continued)

FOREIGN PATENT DOCUMENTS

EP    0 379 225 A1    7/1990

(Continued)

OTHER PUBLICATIONS

Foley et al, "Computer Graphics: Principles and Practices", Second Edition, Jul. 1997, p. 673.

Primary Examiner—Michael Razavi
Assistant Examiner—Daniel Chung
(74) Attorney, Agent, or Firm—Lerner, David, Littenberg, Krumholz & Mentlik, LLP

(57) ABSTRACT

Surfaces of an object are rendered in the order from a surface remotest from a viewpoint. When a rear surface, e.g., a rear surface, is to be rendered, a range, i.e., a range of a texture to be used, projected by way of perspective projection with vectors which are directed from the viewpoint toward a background image and take into account refractions at vertexes of the surface is determined, and the texture in the determined range is mapped onto the surface. When a front surface, e.g., a front surface, is to be rendered, a range, i.e., a range of a texture to be used, projected by way of perspective projection with vectors which are directed from the viewpoint toward a background image and take into account refractions at vertexes of the surface is determined, and the texture in the determined range is mapped onto the surface.

16 Claims, 10 Drawing Sheets

U.S. PATENT DOCUMENTS

| | | | |
|---|---|---|---|
| 5,805,135 A | | 9/1998 | Suzuoki et al. |
| 5,870,099 A | | 2/1999 | Horii et al. |
| 5,877,769 A | * | 3/1999 | Shinohara .................. 345/419 |
| 5,947,823 A | * | 9/1999 | Nimura ...................... 463/32 |
| 5,956,028 A | * | 9/1999 | Matsui et al. ............... 715/757 |
| 5,977,979 A | * | 11/1999 | Clough et al. ............. 345/422 |
| 6,005,967 A | | 12/1999 | Nakagawa et al. |
| 6,034,691 A | * | 3/2000 | Aono et al. ................ 345/582 |
| 6,049,337 A | | 4/2000 | Van Overveld |
| 6,091,422 A | * | 7/2000 | Ouaknine et al. .......... 345/419 |
| 6,201,546 B1 | * | 3/2001 | Bodor et al. ............... 345/620 |
| 6,226,005 B1 | | 5/2001 | Laferriere |
| 6,392,644 B1 | | 5/2002 | Miyata et al. |
| 6,400,364 B1 | * | 6/2002 | Akisada et al. ............ 345/427 |
| 6,417,850 B1 | * | 7/2002 | Kang ......................... 345/422 |

FOREIGN PATENT DOCUMENTS

| | | |
|---|---|---|
| EP | 0 447 222 A1 | 9/1991 |
| EP | 0 666 548 A1 | 8/1995 |
| JP | 11-003432 A1 | 1/1999 |
| WO | WO-97 34213 A1 | 9/1997 |

* cited by examiner

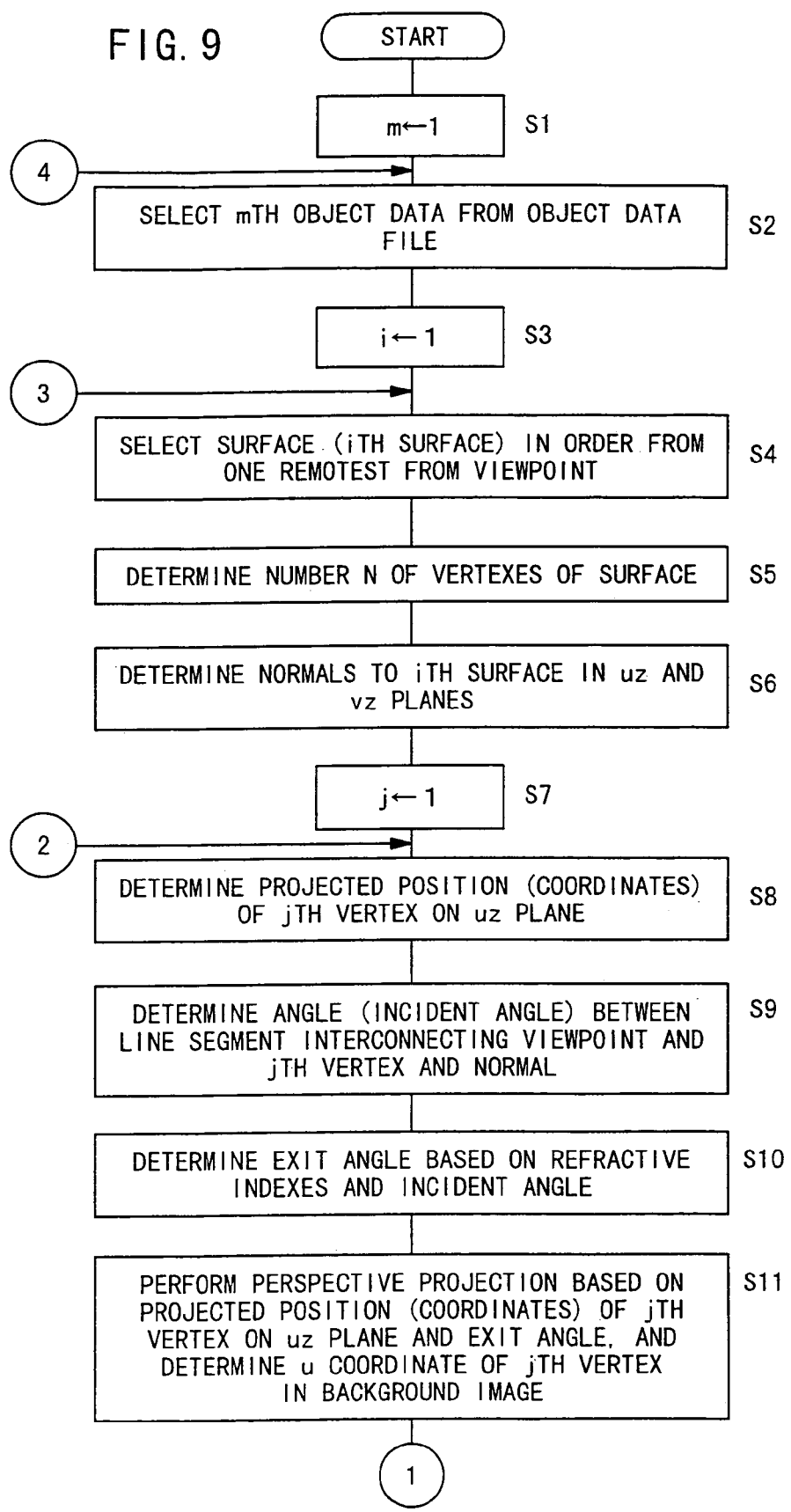

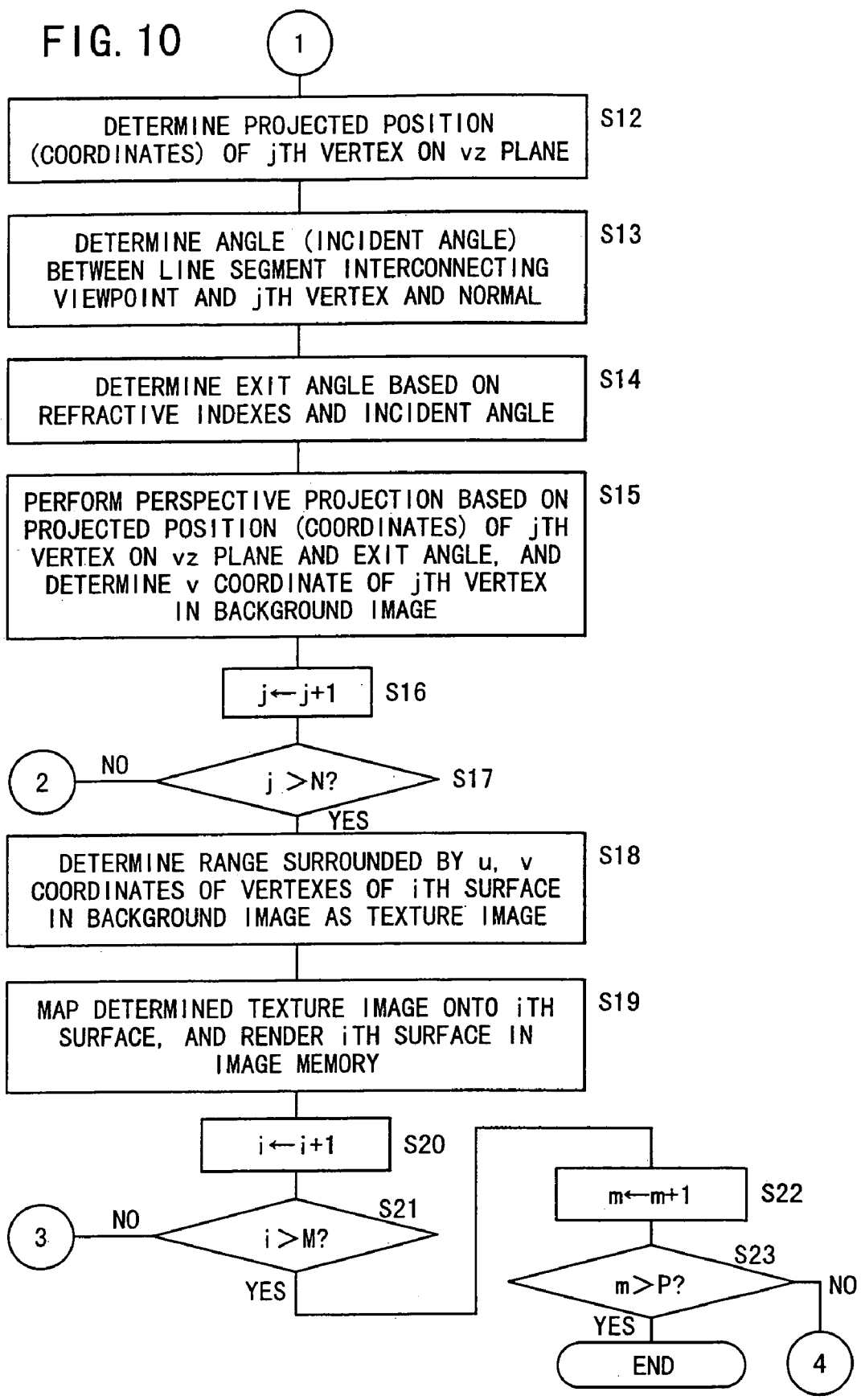

METHODS AND APPARATUS FOR RENDERING AN IMAGE INCLUDING PORTIONS SEEN THROUGH ONE OR MORE OBJECTS OF THE IMAGE

CROSS-REFERENCE TO RELATED APPLICATIONS

This application is a continuation of U.S. patent application Ser. No. 09/656,377 filed Sep. 6, 2000 now U.S. Pat. No. 6,784,882, the entire contents of which is hereby incorporated by reference herein. That application is based upon and claims the benefit of priority from the prior Japanese Patent Application S.N. 11-257565, filed Sep. 10, 1999, the entire contents of which is incorporated herein by reference.

BACKGROUND OF THE INVENTION

1. Field of the Invention

The present invention relates to a method of and an apparatus for rendering an image to express light rays passing through an object and refracted thereby, i.e., a phenomenon known as refraction, at a high speed with a three-dimensional image, a recording medium which stores a program and data for performing such image processing, and a program for performing such image processing.

2. Description of the Related Art

Recently, various computer graphics (CG) processing techniques including hidden line processing, hidden surface removal, smooth shading, texture mapping, etc. have been in rapid progress in combination with quickly growing hardware technologies.

According to a general CG processing scheme, a plurality of three-dimensional shapes (objects) are generated by three-dimensional modeling of CAD, and a rendering process is performed by applying colors and shades to the objects, adding optical properties including mirror reflection, diffuse reflection, refraction, transparency, etc. to the objects, adding surface patterns to the objects, and plotting images depending on surroundings such as window and scenery reflections and ambient light.

If light rays passing through an object and refracted thereby, for example, are to be expressed as a three-dimensional image, then it is necessary to reproduce such an optical phenomenon. The vector of a light ray that is radiated from a viewpoint is refracted when the light ray enters the object and also when the light ray leaves the object.

In order to express the above phenomenon of refraction with a three-dimensional image, it is customary to employ ray tracing rather than polygons.

According to the ray tracing technique, light rays are traced in a space where an object is placed, and the object is rendered with points of intersection between the light rays and the object. Stated otherwise, the intensity of light rays that arrive at a viewpoint is tracked back from the viewpoint while reproducing reflections and refractions at the surfaces of the object according to the realistic behavior of the light rays.

Specifically, a point of intersection between a light ray from a fixed viewpoint and an object as a displayed pixel is sought, and if there is such a point of intersection, then the light ray as it is reflected or refracted by the object is traced. Information as to the point of intersection is stored as information as to the displayed pixel. The information determined with respect to each pixel represents inherent color characteristics including hue, saturation, and brightness, textures including reflections, refractions, gloss, and luster, or shadows and highlights.

However, the ray tracing technique is disadvantageous in that since the above information is associated with each pixel, the overall amount of information that is required is large, and the time required to perform calculations for ray tracing is long.

SUMMARY OF THE INVENTION

It is therefore an object of the present invention to provide a method of and an apparatus for rendering an image, a recording medium, and a program to express light rays passing through an object and refracted thereby at a high speed with a three-dimensional image, for thereby expressing a moving transparent object simply and at a high speed.

According to the present invention, there is provided a method of rendering an image, comprising the steps of rendering surfaces of an object which causes refraction in the order from a surface remotest from a viewpoint, and employing a background image of each of the surfaces as a texture when the surfaces are rendered.

According to the present invention, there is also provided an apparatus for rendering an image, comprising rendering means for rendering surfaces of an object which causes refraction in the order from a surface remotest from a viewpoint, and employing a background image of each of the surfaces as a texture when the surfaces are rendered.

According to the present invention, there is further provided a recording medium storing a program and data, the program comprising the steps of rendering surfaces of an object which causes refraction in the order from a surface remotest from a viewpoint, and employing a background image of each of the surfaces as a texture when the surfaces are rendered.

According to the present invention, there is still further provided a program which can be read and executed by a computer, comprising the steps of rendering surfaces of an object which causes refraction in the order from a surface remotest from a viewpoint, and employing a background image of each of the surfaces as a texture when the surfaces are rendered.

When each surface is to be rendered, since only the background image in each surface is used as a texture image, images can be processed at a high speed. Consequently, light rays passing through an object and refracted thereby can be expressed at a high speed with a three-dimensional image, for thereby expressing a moving transparent object simply and at a high speed.

Preferably, a portion of the background image in a range projected by way of perspective projection with vectors which are directed from the viewpoint toward the background image and take into account refractions at vertexes of the surface is used as the texture when the surface is rendered.

The vectors may be determined based on at least the directions of normals to the surface in a viewpoint coordinate system and the directions of line segments directed from the viewpoint toward the vertexes.

Specifically, the positions of the vertexes as projected onto a uz plane which is made up of a u-axis of the background image and a z-axis of the viewpoint coordinate system are determined, and the coordinates of the vertexes on the u-axis of the background image are determined based on at least the directions of line segments directed from the viewpoint toward the projected positions and the directions of the normals in the uz plane. The positions of the vertexes as projected onto a vz plane which is made up of a v-axis of the background image and the z-axis of the viewpoint coordinate system are determined, and the coordinates of the vertexes on the v-axis of the background image are determined based on at least the directions of line segments directed from the viewpoint toward the projected positions and the directions of the normals in the vz plane.

The background image to be mapped onto the surface can easily be determined, and hence a phenomenon of refraction can be displayed as a three-dimensional image at a high speed.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 9 and 10 are a flowchart of a processing sequence of the rendering means shown in FIG. 8.

DESCRIPTION OF THE PREFERRED EMBODIMENT

An embodiment in which a method of and an apparatus for rendering an image are applied to an entertainment apparatus for performing three-dimensional CG processing, and a recording medium and a program are applied to a recording medium storing a program and data executed by the entertainment apparatus and such a program, will be described below with reference to FIGS. 1 through 10.

Figure 1:
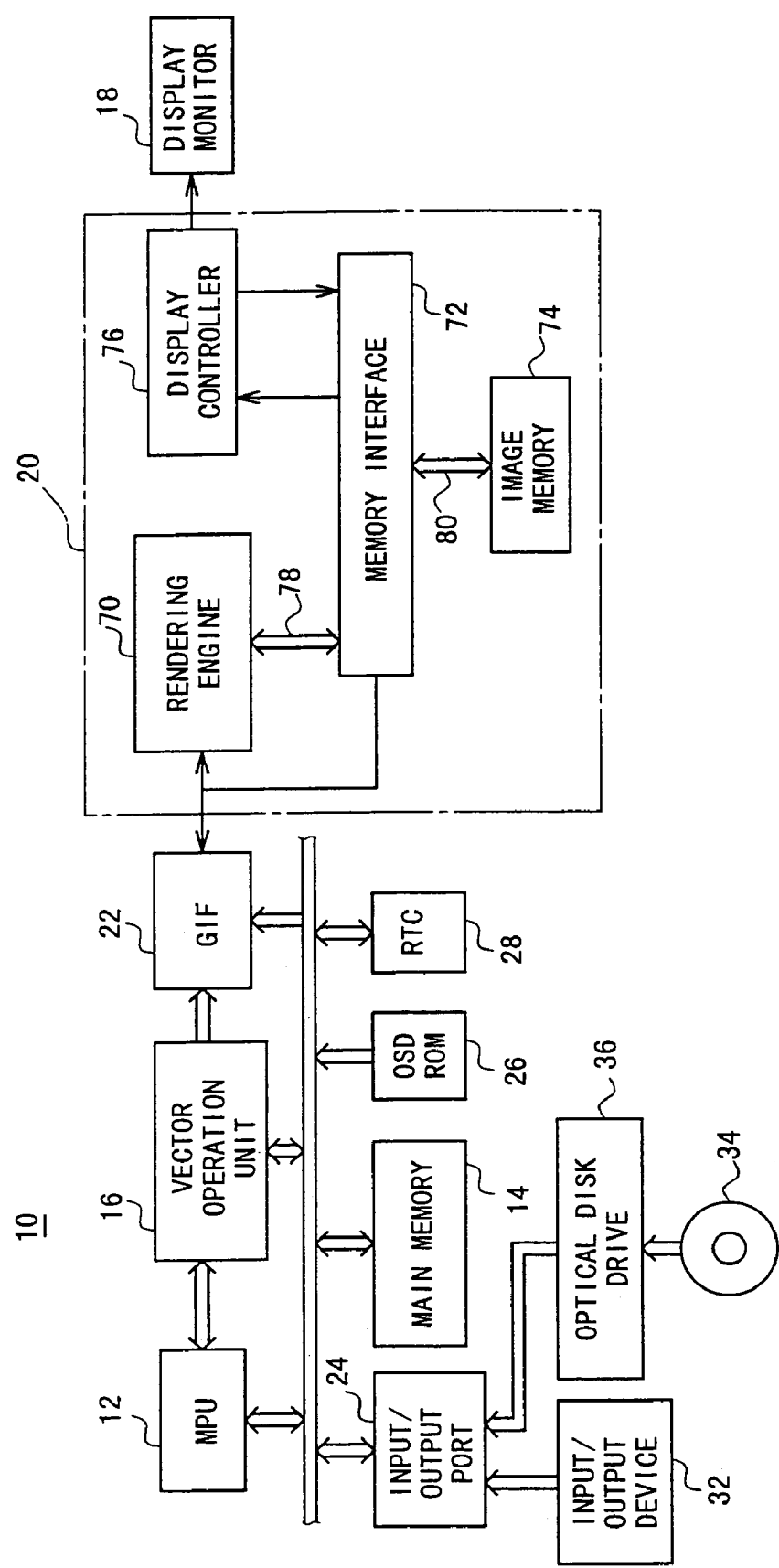
FIG. 1 is a block diagram of a general arrangement of an entertainment apparatus according to the present invention.

As shown in FIG. 1, an entertainment apparatus 10 comprises an MPU 12 for controlling the entertainment apparatus 10, a main memory 14 for storing various programs to be run and various data, a vector operation unit 16 for performing floating-point vector operations required for geometry processing, an image processor 20 for generating image data under the control of the MPU 12 and outputting the generated image data to a display monitor 18, e.g., a CRT, a graphic interface (GIF) 22 for arbitrating transfer paths between the MPU 12, the vector operation unit 16, and the image processor 20, an input/output port 24 for sending data to and receiving data from external devices, a ROM (OSDROM) 26 with an OSD function, which may comprise a flash memory or the like, for controlling the kernel, etc., and a real-time clock 28 having a calendar and clock function.

The main memory 14, the vector operation unit 16, the GIF 22, the OSDROM 26, the real-time clock 28, and the input/output port 24 are connected to the MPU 12 via a bus 30.

To the input/output port 24, there are connected an input/output device 32 for inputting data (key entry data, coordinate data, etc.) to the entertainment apparatus 10, and an optical disk drive 36 for playing back an optical disk 34 such as a CD-ROM or the like in which various programs and data (object-related data, texture data, etc.) are stored.

As shown in FIG. 1, the image processor 20 comprises a rendering engine 70, a memory interface 72, an image memory 74, and a display controller 76 such as a programmable CRT controller or the like.

The rendering engine 70 serves to render image data in the image memory 74 via the memory interface 72 based on a rendering command supplied from the MPU 12.

A first bus 78 is connected between the memory interface 72 and the rendering engine 70, and a second bus 80 is connected between the memory interface 72 and the image memory 74. Each of the first and second buses 78, 80 has a 128-bit width, for example, for allowing the rendering engine 70 to render image data in the image memory 74 at a high speed.

The rendering engine 70 is capable of rendering image data of 320×240 pixels or image data of 640×480 pixels according to the NTSC or PAL system on a real-time fashion, i.e., in 1/60 seconds to 1/30 seconds, more than ten times to several ten times.

The image memory 74 is of a unified memory structure that is able to designate a texture rendering area and a display rendering area as the same area.

The image controller 76 writes texture data read from the optical disk 34 via the optical disk drive 36 or texture data generated in the main memory 14 via the memory interface 72 into the texture rendering area of the image memory 74, and reads image data rendered in the display rendering area of the image memory 74 via the memory interface 72 and outputs the read image data to the display monitor 18 to display an image on its display screen.

A characteristic function of the entertainment apparatus 10 will be described below with reference to FIGS. 2 through 10.

According to the characteristic function, for rendering an object that causes refraction, the surfaces of the object are rendered successively from the one remotest from a viewpoint, and the background image of a surface is used as a texture when each surface is rendered.

A portion of the background image in a range projected by way of perspective projection with vectors which are directed from the viewpoint toward the background image and take into account refractions at vertexes of the surface is employed as the texture, for example, when the surface is rendered.

A vector taking into account the refraction at each of the vertexes of a surface can be determined based on at least the direction of a normal to the surface in a viewpoint coordinate system and the direction of a line segment directed from the viewpoint toward each vertex.

Figure 2:
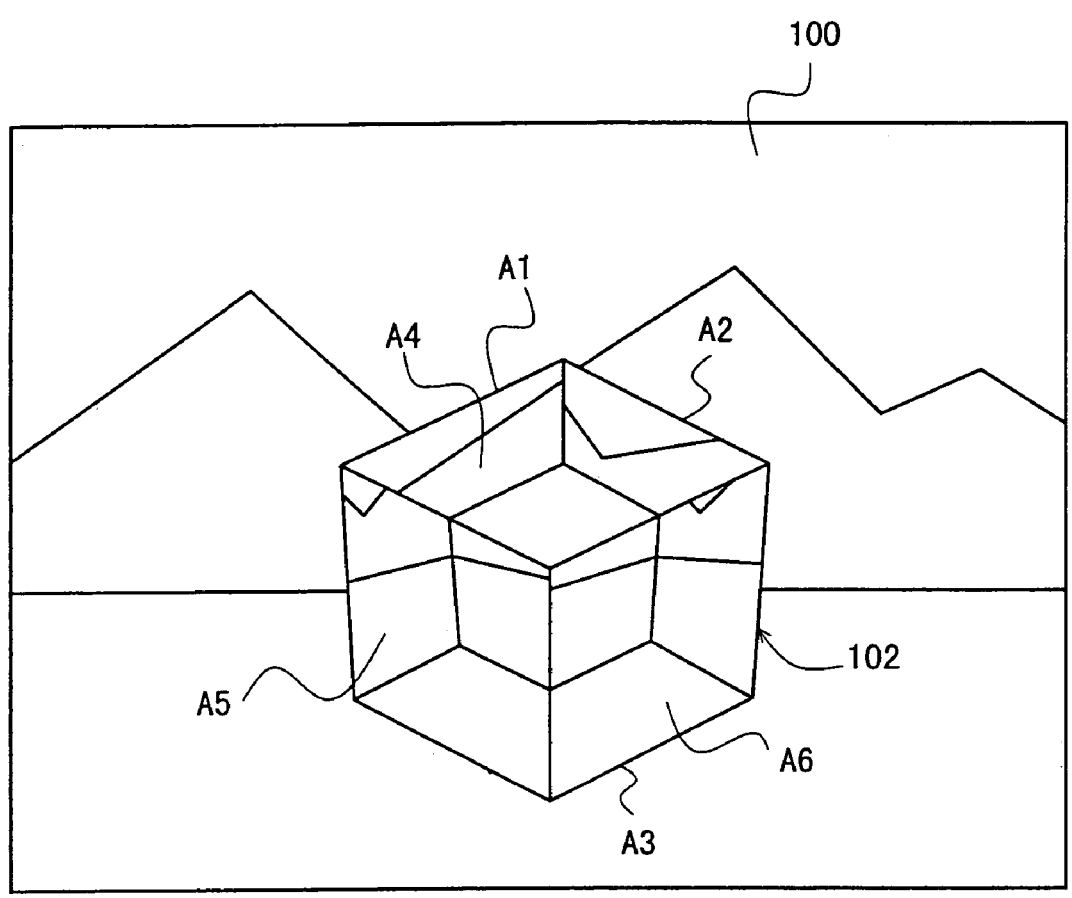
FIG. 2 is a diagram of a displayed image of a mountain scene rendered as a background image and a cube of a material such as glass placed in front of the mountain scene.

A specific process for performing the above characteristic function will be described below with reference to FIGS. 2 through 7. FIG. 2 shows a displayed image of a mountain scene rendered as a background image 100 and a cube 102 of a material such as glass placed in front of the mountain scene. Light rays passing through the cube 102 in the displayed image are refracted according to the above characteristic function.

Figure 3:
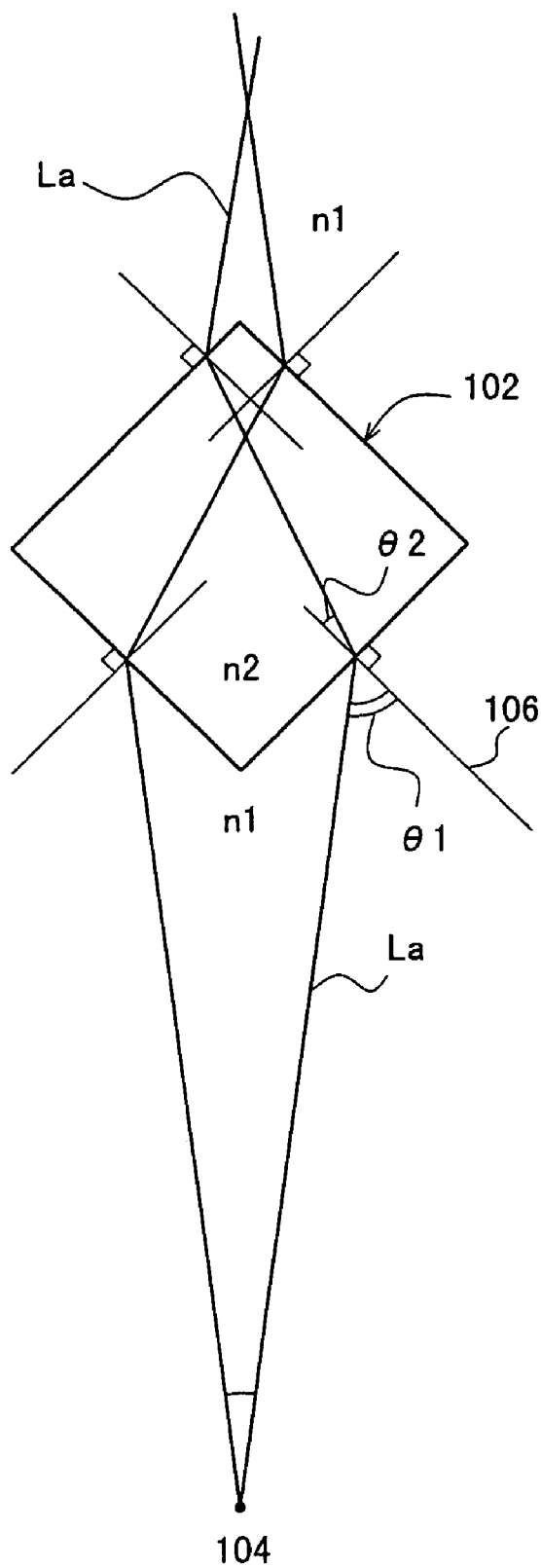
FIG. 3 is a diagram illustrating the manner in which the vector of light rays radiated from a viewpoint is refracted by the cube.

As shown in FIG. 3, the vector of a light ray La radiated from a viewpoint 104 is refracted when the light ray La enters the cube 102 and when the light ray La leaves the cube 102. If it is assumed that the space outside of the cube 102 has a refractive index n1, the cube 102 has a refractive index n2, the light ray La is applied to a surface, closer to the viewpoint 104, of the cube 102 at an incident angle θ1, i.e., an angle between the light ray La and a normal 106 to the surface, and the light ray La leaves the surface of the cube 102 at an exit angle θ2, i.e., an angle between the light ray La and a normal 106 to the surface, then the refraction of the light lay La at the surface is represented by the following equation known as the Snell's law:

n1 sin θ1=n2 sin θ2

The relationship represented by the above equation also holds true for the refraction of the light lay La at another surface, remoter from the viewpoint 104, of the cube 102.

A method of rendering an image according to the present invention determines the positions of the surfaces of the cube 102 in the background image based on the above relationship.

Figure 4A:
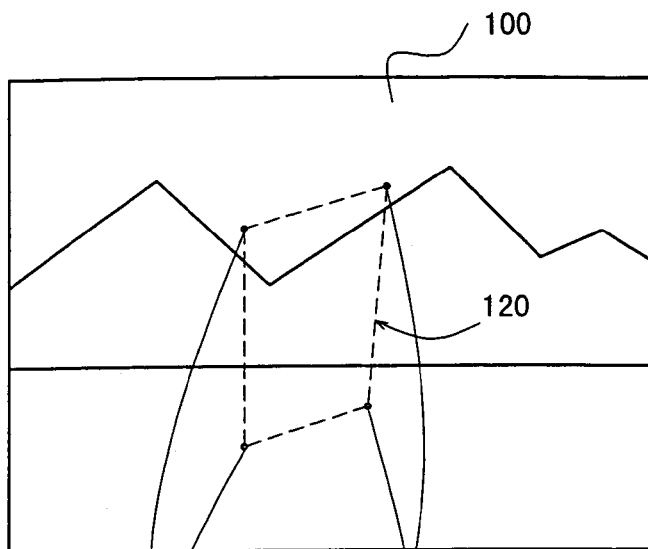
FIG. 4A is a diagram illustrating the range of a texture image for use as a rear surface of a cube.
Figure 4B:
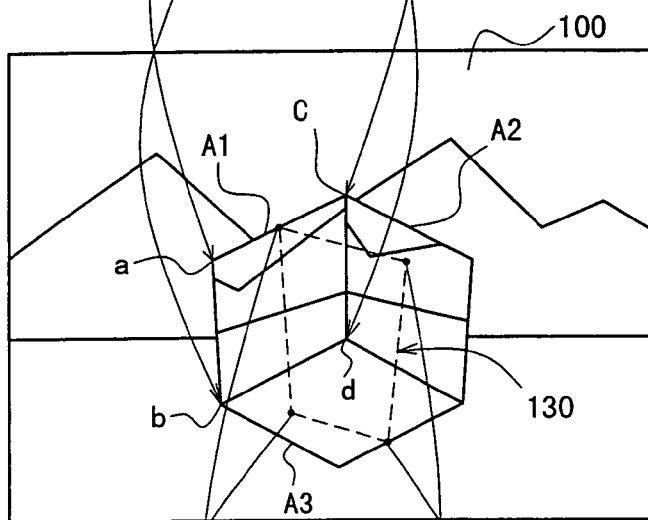
FIG. 4B is a diagram illustrating the texture image shown in FIG. 4A as applied to the cube and the range of a texture image for use as a front surface of the cube.

Specifically, as shown in FIGS. 4A and 4B, of the six surfaces of the cube 102, a surface A1 remotest from the viewpoint is selected, and the positions in the background image 100 of the vertexes a, b, c, d of the surface A1, more accurately the position of the surface A1 in the background image 100, are determined based on at least the direction of a normal to the surface A1 in a viewpoint coordinate system and the directions of line segments directed from the viewpoint toward the vertexes a, b, c, d.

The position of the surface A1 in the background image 100 is a position in the background image 100 that is rendered in the image memory 74. Determining the position of the surface A1 in the background image 100 is equivalent to determining the position of the surface A1 in a uv coordinate system having a u-axis as the horizontal axis of the background image 100 and a v-axis as the vertical axis of the background image 100.

The positions of the vertexes a, b, c, d as projected onto a uz plane which is made up of the u-axis of the background image 100 and a z-axis of the viewpoint coordinate system are determined, and the coordinates of the vertexes a, b, c, d on the u-axis of the background image 100 are determined based on at least the directions of line segments directed from the viewpoint 104 toward the projected positions and the direction of the normal to the surface A1 on the uz plane.

Figure 5:
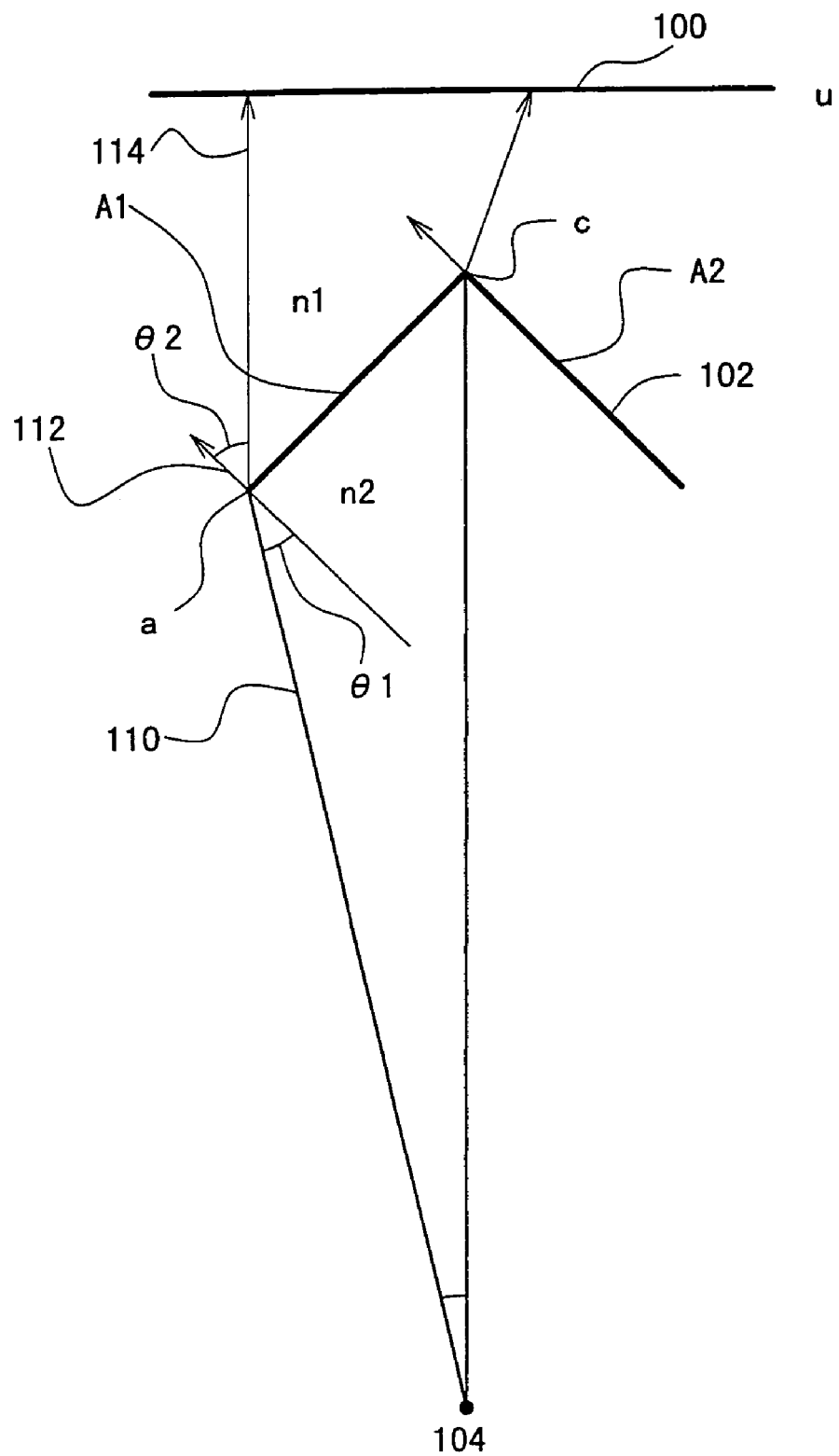
FIG. 5 is a diagram illustrating the manner in which vertexes of the rear surface of the cube are projected onto the background image in view of refractions by way of perspective projection.

For example, as shown in FIG. 5, a line segment 110 from the viewpoint 104 toward a vertex a of the rear surface A1 is analyzed. The direction, i.e., the exit angle θ2, of the line segment 110 from the vertex a toward the background image 100 is determined based on the angle (incident angle) θ1 between the line segment 110 and the normal 112, the refractive index n2 of the cube 102, and the refractive index n1 of the space. The position of a u coordinate of the vertex a in the background image 100 is determined by projecting the vertex a onto the background 100 by way of perspective projection according to the vector of a line segment 114 that is determined by the exit angle θ2. The positions of u coordinates of the other vertexes b, c, d of the surface A1 in the background image 100 are similarly determined.

Then, the positions of the vertexes a, b, c, d as projected onto a vz plane which is made up of the v-axis of the background image 100 and the z-axis of the viewpoint coordinate system are determined, and the coordinates of the vertexes a, b, c, d on the v-axis of the background image 100 are determined based on at least the directions of line segments directed from the viewpoint 104 toward the projected positions and the direction of the normal to the surface A1 on the vz plane.

For example, although not shown, line segment from the viewpoint 104 toward the vertex a is analyzed. The direction, i.e., the exit angle θ2, of the line segment from the vertex a toward the background image 100 is determined based on the angle (incident angle) θ1 between the line segment and the normal, the refractive index n2 of the cube 102, and the refractive index n1 of the space. The position of a v coordinate of the vertex a in the background image 100 is determined by projecting the vertex a onto the background 100 by way of perspective projection according to the vector of a line segment that is determined by the exit angle θ2. The positions of v coordinates of the other vertexes b, c, d in the background image 100 are similarly determined.

In this manner, the u, v coordinates (u, v) of the vertex a of the rear surface A1 in the background image 100 are determined. Similarly, the coordinates of the other vertexes in the background image 100 are determined. Now, as shown in FIGS. 4A and 4B, a range projected by vectors directed from the viewpoint 104 via the surface A1 toward the background image 100 and taking into account the refractions at the vertexes a, b, c, d of the surface A1, i.e., a range 120 of texture to be used, is determined. The texture of the range 120 is then mapped onto the surface A1, which is rendered in the image memory 74.

After the surface A1 has been rendered in the image memory 74, another rear surface A2 is selected, and then processed in the same manner as described above with respect to the surface A1. The surfaces A1 through A6 that make up the cube 102 are successively selected and processed in the order of A1→A2→A3→A4→A5→A6.

After the three rear surfaces A1, A2, A3 have been rendered in the image memory 74, three front surfaces A4, A5, A6 are selected, and then processed in the same manner as described above.

Figure 6:
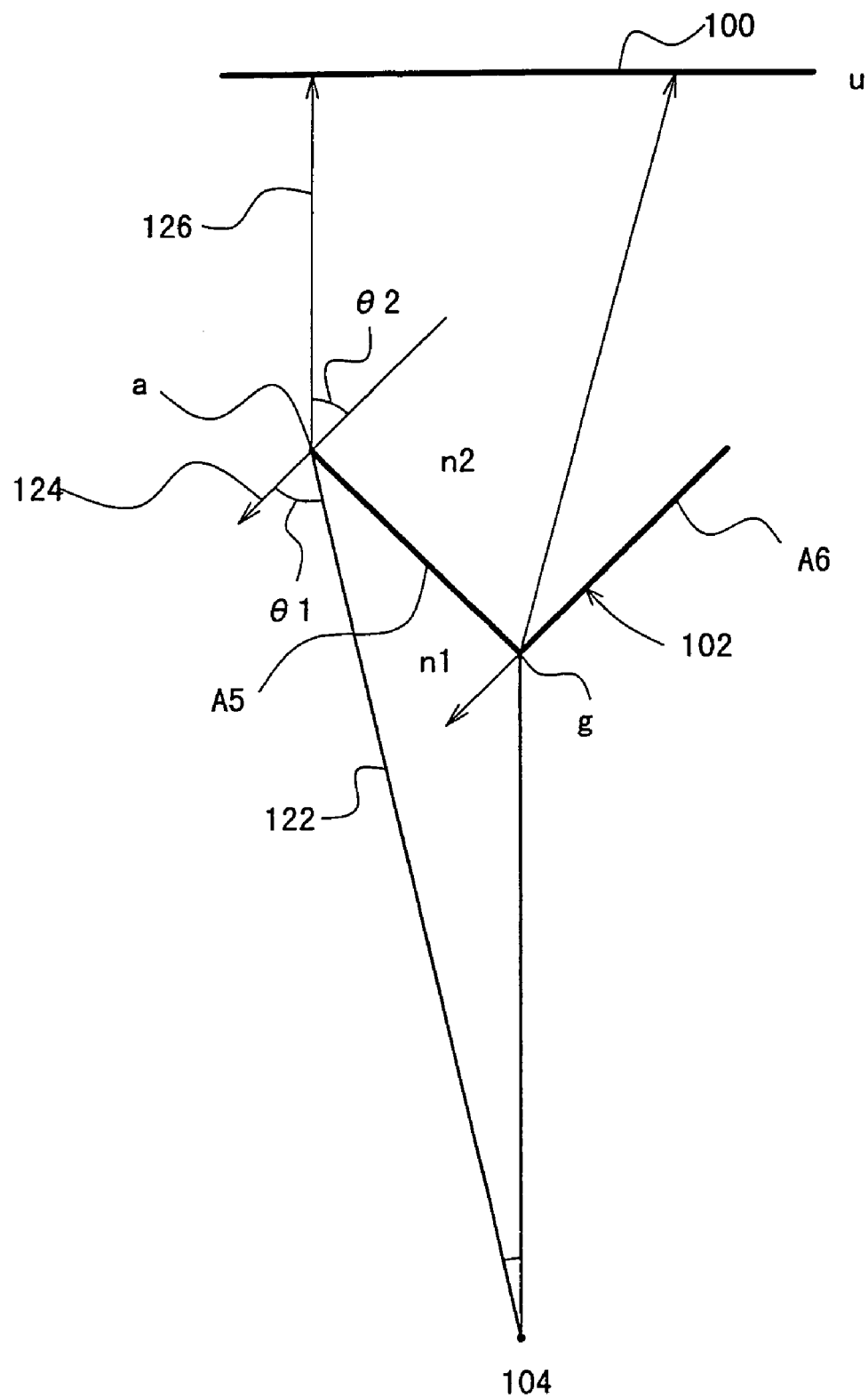
FIG. 6 is a diagram illustrating the manner in which vertexes of the front surface of the cube are projected onto the background image in view of refractions by way of perspective projection.

For example, as shown in FIG. 6, a line segment 122 from the viewpoint 104 toward a vertex a of the front surface A5 is analyzed. The direction, i.e., the exit angle θ2, of the line segment 122 from the vertex a toward the background image 100 is determined based on the angle (incident angle) θ1 between the line segment 122 and a normal 124 to the surface A5, the refractive index n2 of the cube 102, and the refractive index n1 of the space. The position of a u coordinate of the vertex a in the background image 100 is determined by projecting the vertex a onto the background 100 by way of perspective projection according to the vector of a line segment 126 that is determined by the exit angle θ2. The positions of u coordinates of the other vertexes b, g, h of the surface A5 in the background image 100 are similarly determined.

Then, the position of a v coordinate of the vertex a in the background image 100 is determined in the same manner as described above.

Figure 4C:
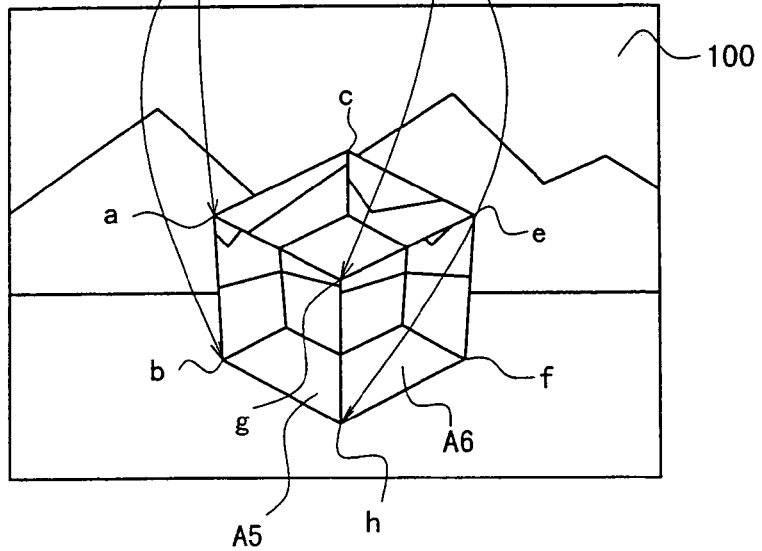
FIG. 4C is a diagram illustrating the texture image shown in FIG. 4B as applied to the cube.

In this manner, the u, v coordinates (u, v) of the vertex a of the front surface A5 in the background image 100 are determined. Similarly, the u, v coordinates for the other vertexes b, g, h in the background image 100 are determined. Now, as shown in FIGS. 4B and 4C, a range projected by vectors directed from the viewpoint 104 via the surface A5 toward the background image 100 and taking into account the refractions at the vertexes a, b, g, h of the surface A5, i.e., a range 130 of texture to be used, is determined. The texture of the range 130 is then mapped onto the surface A5, which is rendered in the image memory 74. At this time, images of the three rear surfaces A1, A2, A3 are rendered in the background image 100 in the front surface A5, and the texture of the front surface A5 includes the images of the three rear surfaces A1, A2, A3.

After the surface A5 has been rendered in the image memory 74, another front surface A6 is selected, and then processed in the same manner as described above with respect to the surface A5.

Figure 7:
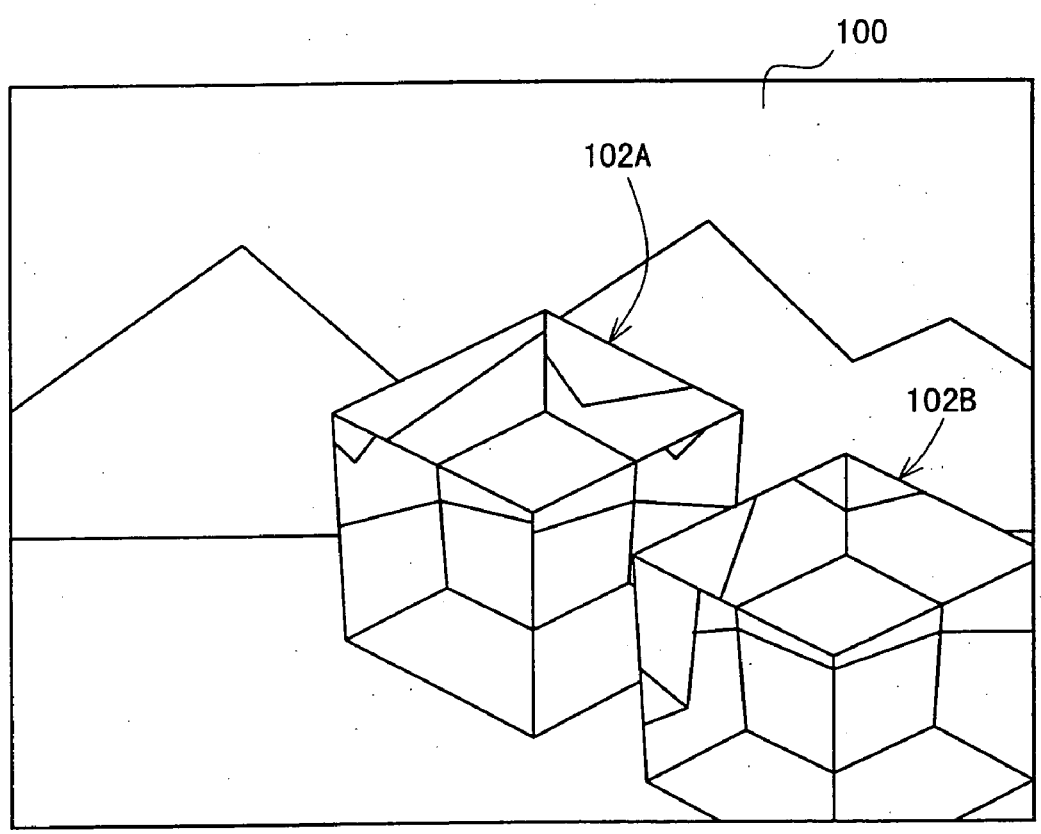
FIG. 7 is a diagram of a displayed image of a mountain scene rendered as a background image and two cubes of a material such as glass placed in front of the mountain scene.

In the above example, one cube 102 is placed in the mountain scene. However, as shown in FIG. 7, the method according to the present invention is also applicable to a plurality of (two in FIG. 7) cubes 102A, 102B placed in a mountain scene. The cubes 102A, 102B are processed successively in the order from the cube 102A remoter from the viewpoint 104.

An example of software, i.e., a rendering means 200 (see FIG. 8), to perform the above function will be described below with reference to FIGS. 8 through 10.

The rendering means 200 is supplied to the entertainment apparatus 10 from a randomly accessible recording medium such as a CD-ROM or a memory card or via a network. It is assumed here that the rendering means 200 is read into the entertainment apparatus 10 from the optical disk 34 such as a CD-ROM.

The rendering means 200 is downloaded in advance from the optical disk 34 played back by the entertainment apparatus 10 into the main memory 14 of the entertainment apparatus 10 according to a predetermined process, and executed by the MPU 12.

Figure 8:
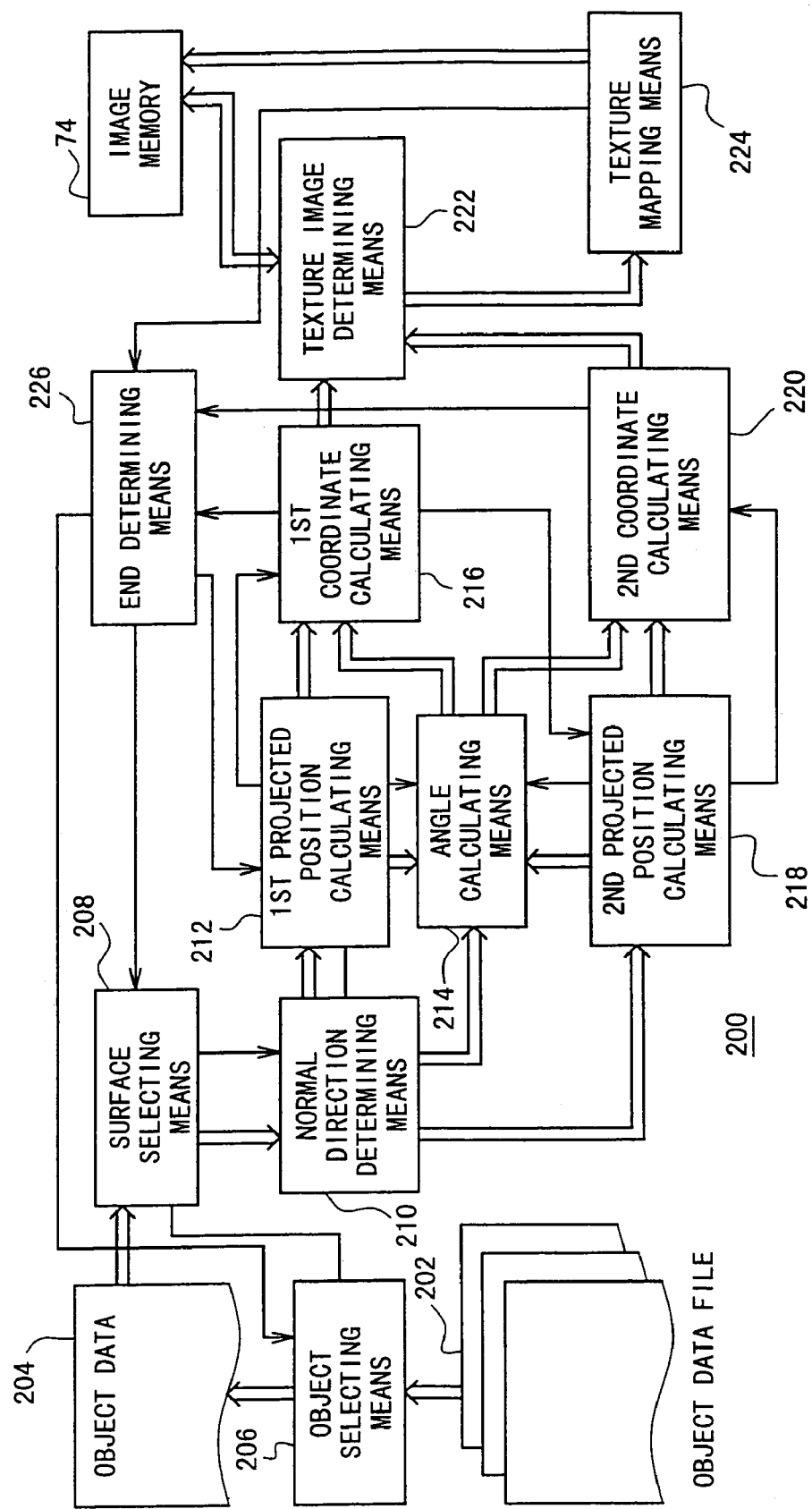
FIG. 8 is a functional block diagram of a rendering means according to the present invention.

As shown in FIG. 8, the rendering means 200 comprises an object selecting means 206 for selecting object data 204 of an object in the order from the one remotest from the viewpoint, among a number of objects registered in an object data file 202, a surface selecting means 208 for selecting a surface in the order from the one remotest from the viewpoint, among a plurality of surfaces of the objects indicated by the selected object data 204, a normal direction determining means 210 for determining the directions of normals in the uz and vz coordinate systems in the selected surface, a first projected position calculating means 212 for determining the position of a vertex of the selected surface as projected onto the uz plane, an angle calculating means 214 for determining an incident angle $\theta 1$ and an exit angle $\theta 2$, and a first coordinate calculating means 216 for determining u coordinates in the background image 100 based on the projected position of the vertex on the uz plane and the exit angles $\theta 2$ at the vertex.

The rendering means 200 also has a second projected position calculating means 218 for determining the position of a vertex of the selected surface as projected onto the vz plane, a second coordinate calculating means 220 for determining v coordinates in the background image 100 based on the projected position of the vertex on the vz plane and the exit angles $\theta 2$ at the vertex, a texture image determining means 222 for determining a texture image to be used from the background image 100 based on the uv coordinates of the vertexes, a texture mapping means 224 for mapping the determined texture image onto the selected surface, and an end determining means 226 for determining whether the processing sequence of the rendering means 200 is completed or not.

A processing sequence of the rendering means 200 will be described below with reference to FIGS. 9 and 10.

In step S1 shown in FIG. 9, the rendering means 200 stores an initial value "1" into an index register m used to retrieve objects, thereby initializing the index register m.

In step S2, the object selecting means 206 selects object data 204 of an object (mth object) in the order from the one remotest from the viewpoint, among a number of objects registered in the object data file 202.

In step S3, the rendering means 200 stores an initial value "1" into an index register i used to retrieve surfaces of objects, thereby in italizing the index register i.

In step S4, the surface selecting means 208 selects a surface (ith surface) in the order from the one remotest from the viewpoint, among a plurality of surfaces of the objects indicated by the selected object data 204.

In step S5, the rendering means 200 determines the number N of vertexes of the ith surface. Thereafter, in step S6, the normal direction determining means 210 determines the directions of normals to the ith surface in the uz and vz coordinate systems.

In step S7, the rendering means 200 stores an initial value "1" into an index register j used to retrieve vertexes, thereby initializing the index register j. In step S8, the first projected position calculating means 212 determines the position (coordinates) of a jth vertex as projected onto the uz plane.

In step S9, the angle calculating means 214 determines an angle (incident angle) $\theta 1$ between a line segment interconnecting the viewpoint and the jth vertex and the normal in the uz plane. In step S10, the angle calculating means 214 determines an angle (exit angle) $\theta 2$ based on the refractive index of the incident medium, the refractive index of the exit medium, and the incident angle $\theta 1$.

In step S11, the first coordinate calculating means 216 projects the jth vertex by way of perspective projection in the direction determined by the position (coordinates) of the jth vertex as projected onto the uz plane and the exit angle $\theta 2$, and determines the position (u coordinates) of the jth vertex in the background image 100.

In step S12 shown in FIG. 10, the second projected position calculating means 218 determines the position (coordinates) of the jth vertex as projected onto the vz plane.

In step S13, the angle calculating means 214 determines an angle (incident angle) $\theta 1$ between a line segment interconnecting the viewpoint and the jth vertex and the normal in the vz plane. In step S14, the angle calculating means 214 determines an angle (exit angle) $\theta 2$ based on the refractive index of the incident medium, the refractive index of the exit medium, and the incident angle $\theta 1$.

In step S14, the second coordinate calculating means 220 projects the jth vertex by way of perspective projection in the direction determined by the position (coordinates) of the jth vertex as projected onto the vz plane and the exit angle $\theta 2$, and determines the position (v coordinates) of the jth vertex in the background image 100.

In step S16, the rendering means 200 increments the value of the index register j by "1". In step S17, the rendering means 200 decides whether uv coordinates of all the vertexes of the ith surface have been determined or not, based on whether the value of the index register j is greater than the number N of vertexes or not.

If uv coordinates of the vertexes of all the ith surface have not been determined, then control goes back to step S8 for determining uv coordinates of a next vertex. If uv coordinates of the vertexes of all the ith surface have been determined, then control proceeds to step S18. In step S18, the texture image determining means 222 determines a portion of the background image 100 in a range surrounded by the uv coordinates of the vertexes of the ith surface, as a texture image.

In step S19, the texture mapping means 224 maps the determined texture image onto the ith surface, and renders the ith surface with the mapped texture image in the image memory 74.

In step S20, the rendering means 200 increments the value of the index register i by "1". In step S21, the end determining means 226 decides whether the processings with respect to all the surfaces of the object have been completed or not, based on whether the value of the index register i is greater than the number M of surfaces of the object or not.

If the texture mapping has not been completed for all the surfaces, then control goes back to step S4 for processing a next surface. If the texture mapping has been completed for all the surfaces, then control proceeds to step S22 in which the rendering means 200 increments the value of the index register m by "1". In step S23, the end determining means 226 decides whether the processings with respect to all the objects have been completed or not, based on whether the value of the index register m is greater than the number P of objects or not.

If the processing with respect to all the objects have not been completed, then control goes back to step S4 for processing a next object. If the processing with respect to all the objects have been completed, then the processing sequence of the rendering means 200 is brought to an end.

As described above, when the rendering means according to the present embodiments 200 renders each surface of an object where light ray are refracted, the rendering means 200 uses only the background image 100 in each surface as a texture image, and hence can process images at a high speed. Consequently, light rays passing through an object and refracted thereby can be expressed at a high speed with a three-dimensional image, for thereby expressing a moving transparent object simply and at a high speed.

Although a certain preferred embodiment of the present invention has been shown and described in detail, it should be understood that various changes and modifications may be made therein without departing from the scope of the appended claims.

What is claimed is:

1. A method of automatically rendering an image, comprising:
    selecting a surface of a transparent or semi-transparent light-refracting object having a plurality of surfaces, the selected surface being remote from a virtual viewpoint;
    selecting a first range of a background image portion disposed behind the object as viewed from the virtual viewpoint, the first range being selected by perspective projection using first vectors directed from the virtual viewpoint towards the background image portion, taking into account refractions at vertexes of the remote surface;
    employing the first range of the background image portion as a texture to render the remote surface;
    thereafter, selecting a second surface of the object, the second surface being closer to the virtual viewpoint than the remote surface;
    selecting a second range of the background image portion by perspective projection using second vectors directed from the virtual viewpoint towards the background image portion, taking into account refractions at vertexes of the second surface; and
    employing the second range of the background image portion as a texture to render the second surface.

2. The method as claimed in claim 1, wherein
    the first vectors include first line segments directed from the virtual viewpoint towards the vertexes of the remote surface and second line segments directed from the vertexes of the remote surface towards the background image portion, the first line segments being disposed at incident angles with respect to normals to the remote surface and the second line segments being disposed at second angles with respect to normals to the remote surface, the second angles being determined by refractions according to the incident angles at the remote surface, and
    the second vectors include first line segments directed from the virtual viewpoint towards the vertexes of the second surface and second line segments directed from the vertexes of the second surface towards the background image portion, the first line segments being disposed at incident angles with respect to normals to the second surface and the second line segments being disposed at second angles with respect to normals to the second surface, the second angles being determined by refractions according to the incident angles at the second surface.

3. The method as claimed in claim 2, wherein
    the second angles of the first vectors are determined by the normals at the remote surface, the incident angles of the first line segments, a refractive index of a medium occupying a space adjacent the remote surface of the object, and a refractive index of the object at the remote surface, and
    the second angles of the second vectors are determined by the normals at the second surface, the incident angles of the first line segments, a refractive index of a medium occupying a space adjacent the second surface of the object, and a refractive index of the object at the second surface.

4. The method as claimed in claim 2, wherein
    the background image portion is disposed in a uv plane in which a u-axis and a v-axis orthogonal to the u-axis are disposed, the virtual viewpoint is displaced from the uv plane in a direction of a z-axis orthogonal to the uv plane, such that the vertexes of the remote surface and the vertexes of the second surface are located by u, v and z coordinates of the u-axis, v-axis and z-axis, respectively, and the first and second ranges of the background image portion are selected by:
    projecting the first line segments, the normals to the remote surface and the normals to the second surface onto a uz plane in which the u-axis and the z-axis are disposed,
    determining the u-coordinates of the first and second ranges of the background image portion in the uv plane based on directions of the projections of the first line segments in the uz plane, the projections of the normals to the remote surface in the uz plane and the projections of the normals to the second surface in the uz plane,
    projecting the first line segments, the normals to the remote surface and the normals to the second surface onto a vz plane in which the v-axis and the z-axis are disposed, and
    determining the v-coordinates of the first and second ranges of the background image portion in the uv plane based on directions of the projections of the first line segments in the vz plane, the projections of the normals to the remote surface in the vz plane and projections of the normals to the second surface in the vz plane.

5. An image processing apparatus, comprising:

a processor, the processor being operable to:

select a surface of a transparent or semi-transparent light-refracting object having a plurality of surfaces, the selected surface being remote from a virtual viewpoint, select a first range of a background image portion disposed behind the object as viewed from the virtual viewpoint, the first range being selected by perspective projection using first vectors directed from the virtual viewpoint towards the background image portion, taking into account refractions at vertexes of the remote surface, employ the first range of the background image portion as a texture to render the remote surface, thereafter, select a second surface of the object, the second surface being closer to the virtual viewpoint than the remote surface, select a second range of the background image portion by perspective projection using second vectors directed from the virtual viewpoint towards the background image portion, taking into account refractions at vertexes of the second surface, and employ the second range of the background image portion as a texture to render the second surface.

6. The image processing apparatus as claimed in claim 5, wherein the first vectors include first line segments directed from the virtual viewpoint towards the vertexes of the remote surface and second line segments directed from the vertexes of the remote surface towards the background image portion, the first line segments being disposed at incident angles with respect to normals to the remote surface and the second line segments being disposed at incident angles with respect to normals to the remote surface, the processor being operable to determine the second angles by refractions according to the incident angles at the remote surface, and the second vectors include first line segments directed from the virtual viewpoint towards the vertexes of the second surface and second line segments directed from the vertexes of the second surface towards the background image portion, the first line segments being disposed at incident angles with respect to normals to the second surface and the second line segments being disposed at second angles with respect to normals to the second surface, the processor being operable to determine the second angles by refractions according to the incident angles at the second surface.

7. The image processing apparatus as claimed in claim 6, wherein the processor is operable to determine the second angles of the first vectors by the normals at the remote surface, the incident angles of the first line segments, a refractive index of a medium occupying a space adjacent the remote surface of the object, and a refractive index of the object at the remote surface, and the processor is operable to determine the second angles of the second vectors by the normals at the second surface, the incident angles of the first line segments, a refractive index of a medium occupying a space adjacent the second surface of the object, and a refractive index of the object at the second surface.

8. The image processing apparatus as claimed in claim 6, wherein the background image portion is disposed in a uv plane in which a u-axis and a v-axis orthogonal to the u-axis are disposed, and the virtual viewpoint is displaced from the uv plane in a direction of a z-axis orthogonal to the uv plane, such that the vertexes of the remote surface and the vertexes of the second surface are located by u, v and z coordinates of the u-axis, v-axis and z-axis, respectively, the processor being operable to determine the first and second ranges of the background image portion by:

projecting the first line segments, the normals to the remote surface and the normals to the second surface onto a uz plane in which the u-axis and the z-axis are disposed, determining the u-coordinates of the first and second ranges of the background image portion in the uv plane based on directions of the projections of the first line segments in the uz plane, the projections of the normals to the remote surface in the uz plane and the projections of the normals to the second surface in the uz plane, projecting the first line segments, the normals to the remote surface and the normals to the second surface onto a vz plane in which the v-axis and the z-axis are disposed, and determining the v-coordinates of the first and second ranges of the background image portion in the uv plane based on directions of the projections of the first line segments in the vz plane, the projections of the normals to the remote surface in the vz plane and projections of the normals to the second surface in the vz plane.

9. A recording medium having instructions thereon for performing a method of automatically rendering an image, the image including a background image portion, the method comprising:

selecting a surface of a transparent or semi-transparent light-refracting object having a plurality of surfaces, the selected surface being remote from a virtual viewpoint;

selecting a first range of a background image portion disposed behind the object as viewed from the virtual viewpoint, the first range being selected by perspective projection using first vectors directed from the virtual viewpoint towards the background image portion, taking into account refractions at vertexes of the remote surface;

employing the first range of the background image portion as a texture to render the remote surface;

thereafter, selecting a second surface of the object, the second surface being closer to the virtual viewpoint than the remote surface;

selecting a second range of the background image portion by perspective projection using second vectors directed from the virtual viewpoint towards the background image portion, taking into account refractions at vertexes of the second surface; and employing the second range of the background image portion as a texture to render the second surface.

10. The recording medium as claimed in claim 9, wherein the first vectors include first line segments directed from the virtual viewpoint towards the vertexes of the remote surface and second line segments directed from the vertexes of the remote surface towards the background image portion, the first line segments being disposed at incident angles with respect to normals to the remote surface and the second line segments being disposed at second angles with respect to normals to the remote surface, the second angles being determined by refractions according to the incident angles at the remote surface, and the second vectors include first line segments directed from the virtual viewpoint towards the vertexes of the second surface and second line segments directed from the vertexes of the second surface towards the background image portion, the first line segments being disposed at incident angles with respect to normals to the second surface and the second line segments being disposed at second angles with respect to normals to the second surface, the second angles being determined by refractions according to the incident angles at the second surface.

11. The recording medium as claimed in claim 9, wherein the second angles of the first vectors are determined by the normals at the remote surface, the incident angles of the first line segments, a refractive index of a medium occupying a space adjacent the remote surface of the object, and a refractive index of the object at the remote surface, and the second angles of the second vectors are determined by the normals at the second surface, the incident angles of the first line segments, a refractive index of a medium occupying a space adjacent the second surface of the object, and a refractive index of the object at the second surface.

12. The recording medium as claimed in claim 10, wherein the background image portion is disposed in a uv plane in which a u-axis and a v-axis orthogonal to the u-axis are disposed, the virtual viewpoint is displaced from the uv plane in a direction of a z-axis orthogonal to the uv plane, such that the vertexes of the remote surface and the vertexes of the second surface are located by u, v and z coordinates of the u-axis, v-axis and z-axis, respectively, and the first and second ranges of the background image portion are selected by:

projecting the first line segments, the normals to the remote surface and the normals to the second surface onto a uz plane in which the u-axis and the z-axis are disposed, determining the u-coordinates of the first and second ranges of the background image portion in the uv plane based on directions of the projections of the first line segments in the uz plane, the projections of the normals to the remote surface in the uz plane and the projections of the normals to the second surface in the uz plane, projecting the first line segments, the normals to the remote surface and the normals to the second surface onto a vz plane in which the v-axis and the z-axis are disposed, and determining the v-coordinates of the first and second ranges of the background image portion in the uv plane based on directions of the projections of the first line segments in the vz plane, the projections of the normals to the remote surface in the vz plane and projections of the normals to the second surface in the vz plane.

13. An image processing apparatus operable to perform a rendering method, the method comprising:

selecting a surface of a transparent or semi-transparent light-refracting object having a plurality of surfaces, the selected surface being remote from a virtual viewpoint;

selecting a first range of a background image portion disposed behind the object as viewed from the virtual viewpoint, the first range being selected by perspective projection using first vectors directed from the virtual viewpoint towards the background image portion, taking into account refractions at vertexes of the remote surface;

employing the first range of the background image portion as a texture to render the remote surface and for selecting a second surface of the object, the second surface being closer to the virtual viewpoint than the remote surface;

selecting a second range of the background image portion by perspective projection using second vectors directed from the virtual viewpoint towards the background image portion, taking into account refractions at vertexes of the second surface; and employing the second range of the background image portion as a texture to render the second surface.

14. The image processing apparatus as claimed in claim 13, wherein the first vectors include first line segments directed from the virtual viewpoint towards the vertexes of the remote surface and second line segments directed from the vertexes of the remote surface towards the background image portion, the first line segments being disposed at incident angles with respect to normals to the remote surface and the second line segments being disposed at second angles with respect to normals to the remote surface, the method further including determining the second angles by refractions according to the incident angles at the remote surface, and the second vectors include first line segments directed from the virtual viewpoint towards the vertexes of the second surface and second line segments directed from the vertexes of the second surface towards the background image portion, the first line segments being disposed at incident angles with respect to normals to the second surface and the second line segments being disposed at second angles with respect to normals to the second surface, the method further including determining the second angles by refractions according to the incident angles at the second surface.

15. The image processing apparatus as claimed in claim 14, wherein the method further includes determining the second angles of the first vectors by the normals at the remote surface, the incident angles of the first line segments, a refractive index of a medium occupying a space adjacent the remote surface of the object, and a refractive index of the object at the remote surface, and determining the second angles of the second vectors by the normals at the second surface, the incident angles of the first line segments, a refractive index of a medium occupying a space adjacent the second surface of the object, and a refractive index of the object at the second surface.

16. The image processing apparatus as claimed in claim 14, wherein the background image portion is disposed in a uv plane in which a u-axis and a v-axis orthogonal to the u-axis are disposed, and the virtual viewpoint is displaced from the uv plane in a direction of a z-axis orthogonal to the uv plane, such that the vertexes of the remote surface and the vertexes of the second surface are located by u, v and z coordinates of the u-axis, v-axis and z-axis, respectively, the method further including determining the first and second ranges of the background image portion by:

projecting the first line segments, the normals to the remote surface and the normals to the second surface onto a uz plane in which the u-axis and the z-axis are disposed, determining the u-coordinates of the first and second ranges of the background image portion in the uv plane based on directions of the projections of the first line segments in the uz plane, the projections of the normals to the remote surface in the uz plane and the projections of the normals to the second surface in the uz plane, projecting the first line segments, the normals to the remote surface and the normals to the second surface onto a vz plane in which the v-axis and the z-axis are disposed, and determining the v-coordinates of the first and second ranges of the background image portion in the uv plane based on directions of the projections of the first line segments in the vz plane, the projections of the normals to the remote surface in the vz plane and projections of the normals to the second surface in the vz plane.

* * * * *